United States Patent [19]

Mair

[11] Patent Number: 4,606,897

[45] Date of Patent: Aug. 19, 1986

[54] METHOD TO IMPROVE ACIDULATION QUALITY OF IDAHO PHOSPHATE ROCK

[75] Inventor: Alexander D. Mair, Florence, Ala.

[73] Assignee: Tennessee Valley Authority, Muscle Shoals, Ala.

[21] Appl. No.: 728,440

[22] Filed: Apr. 29, 1985

Related U.S. Application Data

[63] Continuation of Ser. No. 710,772, Mar. 11, 1985, abandoned.

[51] Int. Cl.⁴ ............................................. C01B 25/16
[52] U.S. Cl. .................................... 423/167; 423/319; 423/320
[58] Field of Search ....................... 423/167, 319, 320

[56] References Cited

U.S. PATENT DOCUMENTS 4,325,928 4/1982 Lowe ................................... 423/319
4,389,380 6/1983 Parks ................................... 423/319

Primary Examiner—John Doll
Assistant Examiner—Wayne Langel
Attorney, Agent, or Firm—Robert A. Petrusek

[57] ABSTRACT

Phosphate rock, containing appreciable quantities of organic impurities, is thermally treated under controlled conditions to fully utilize the fuel values of the organic matter contained therein. This process is beneficial for treating deposits of unaltered Idaho rock containing both higher grade phosphate rock and lower grade phosphatic shales and recovering therefrom substantially all the phosphate values as a rock product rendered more acceptable for acidulation to wet-process phosphoric acid.

3 Claims, 1 Drawing Figure

U.S. Patent    Aug. 19, 1986    4,606,897
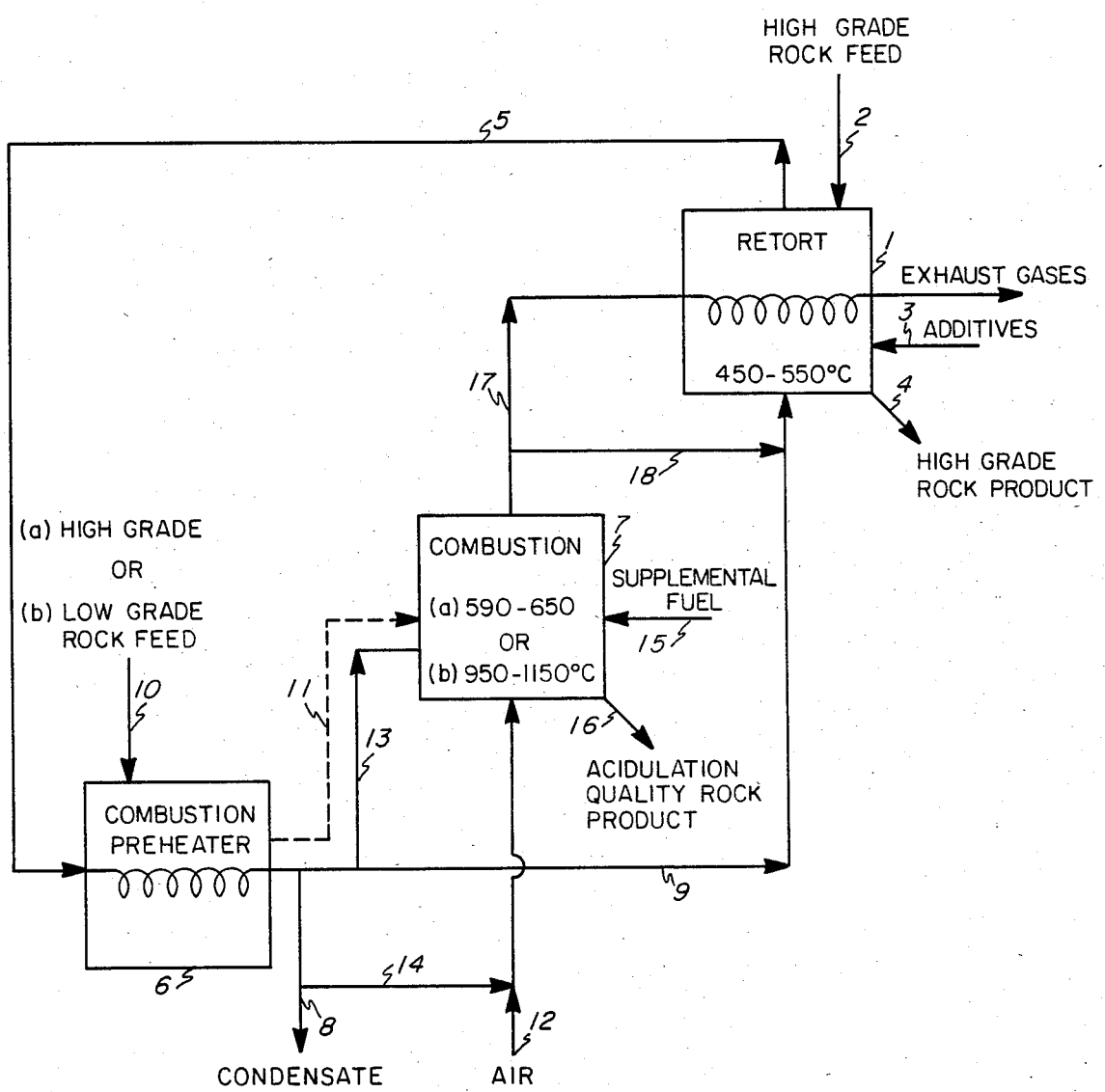

METHOD TO IMPROVE ACIDULATION QUALITY OF IDAHO PHOSPHATE ROCK

The invention herein described may be manufactured and used by and for the Government for governmental purposes without the payment to me of any royalty therefor.

This is a continuation of application Ser. No. 710,772, filed Mar. 11, 1985, abandoned for METHOD TO IMPROVE ACIDULATION QUALITY OF IDAHO PHOSPHATE ROCK, Alexander D. Mair.

INTRODUCTION

The present invention relates to the thermal treatment of phosphate ores. More particularly the present invention relates to improving the quality of organic rich phosphate rock and lower grade shales from the Phosphoria Formation as found in Idaho by rendering the resulting thermally treated product acceptable for acidulation to phosphoric acid by the wet process.

BACKGROUND OF THE INVENTION

1. Field of the Invention

The Phosphoria Formation, which is located in Southeast Idaho and contiguous areas and is of Permian Age, is the largest known deposit of sedimentary phosphate rock in the world. Much of the deposit is deeply buried and can be classified only as a phosphate resource, being uneconomical to mine at the present time. However, due to past tectonic disturbances, numerous surficial exposures of the Phosphoria Formation occur, and these account for the bulk of the phosphate rock mined to date from this deposit. The Phosphoria Formation contains interlayered beds of high grade apatitic phosphate, lower grade phosphatic shales and other non-phosphatic beds of shale and chert. In their original unweathered state, the phosphatic beds contain considerable organic matter and rhombic carbonates, especially dolomite, $CaMg(CO_3)_2$. The phosphate is a fine grained material generally consisting of minute oolites of francolite, a carbonate fluorapatite mineral. Often, and especially in the lower grade shales, the phosphate particles are bonded in a matrix with accessory minerals, such as dolomite and quartz and with phosphatic cements formed by dissolution and subsequent reprecipitation of the source phosphate. In weathered or altered deposits, as found in the surficial deposits currently mined, supra, much of the organic matter and dolomite impurities have been removed in vivo, thereby upgrading the phosphate content, increasing the friability of the rock, and making physical beneficiation more readily accomplished.

As presently practiced, rock from the Phosphoria Formation (henceforward, for the sake of convenience, termed Idaho rock) is selectively mined from the interlayered beds, with only the higher grade phosphate material utilized for wet-process phosphoric acid manufacture. Such rock is usually beneficiated by washing and scrubbing, followed by calcining in air at about 800° C. to remove residual organic matter. Of the lower grade phosphatic rock and shale also mined, some of suitable quality is used in the highly energy intensive and expensive furnace process for producing elemental phosphorus, but the remainder is stockpiled or discarded. As deposits of the surficial altered Idaho rock are becoming exhausted, phosphate producers are increasingly turning to the partially altered or unaltered deposits as sources of their raw material. The increased content of organic matter and dolomite, and the often more indurated nature of the ore makes processing of the unaltered rock more difficult.

Calcination of Idaho rock to remove the organic matter therefrom is presently found to be necessary inasmuch as the presence of such organic material in the rock is deleterious to the subsequent manufacture of phosphoric acid therefrom by the wet process, in which the rock is reacted with a mixture of phosphoric and sulfuric acids followed by filtration of the calcium sulfate formed in the acidulation step to thereby produce a filtrate of phosphoric acid. The presence of such organic material causes undesirable foaming in the acidulation step and can severely hinder filtration of the by-product calcium sulfate from the product acid.

With the increased organic content of the partially altered or unaltered Idaho rock, the calcination step is usually self-sustaining and, as currently practiced, often highly energy inefficient since addition of quenching water is often necessary to moderate the combustion reaction in the calciner. Undesirable formation of sulfide in the calcined product is exacerbated by the high organic content of the more unaltered rock. Particularly objectionable is formation during calcination of what shall be termed "acid-evolved sulfide," the sulfide from which is evolved noxious gases, such as hydrogen sulfide, during acidulation of the rock. In addition to its suspected role in increasing equipment corrosion, acid evolved sulfide, as a precursor of such toxic fumes, is a potential health and environmental hazard.

Appreciable concentrations of soluble magnesium, aluminum, and iron in wet-process phosphoric acid are deleterious to processing and product quality. Presence of these metal ions may cause severe filtration problems, undesirably high acid viscosity, and deposits of sludges during and after processing of the rock to phosphoric acid. The lower grade Idaho phosphate rocks and shales are undesirably rich sources of acid soluble Mg, Al and Fe, and no practical method has heretofore been developed to process this material to phosphoric acid by the wet process. Thus, apart from the small portion used in manufacturing furnace acid, this lower grade Idaho rock, especially in its unaltered form, cannot be used economically with present technology. A significant fraction of the phosphate values in many locations is present as this low grade rock.

Resources of unaltered Idaho rock are vast. For the entire Meade Peak Phosphatic Shale member of the Phosphoria Formation existing within a 350 square mile area of Southeast Idaho, it has been estimated (R. J. Gulbrandsen and D. J. Krier, U.S. Geological Survey Bulletin 1496, 1980) that a total of 125 billion tons of rock with an average $P_2O_5$ content of 10.8 percent and an average organic matter content of 8.0 percent is contained therein. Of this rock, these authors estimate that 22.0 billion tons of underground phosphate and a further 5.0 billion tons just underlying the surface contain at least 20 percent $P_2O_5$. The average $P_2O_5$ content of this higher grade underground rock is estimated at 27.7 percent and the average amount of associated organic matter is estimated to be 6.8 percent. In the face of the rapidly diminishing reserves of the world's high grade phosphate rock, it is apparent that a need exists for improved processes for extracting the phosphate values from this huge resource of unaltered Idaho phosphate rock. More specifically, a need exists for a thermal process which will improve the quality of the phosphate material by removing the organic matter, by minimizing undesirable sulfide formation, and by removing or deactivating most of the soluble Mg, Al, and Fe species, such as to convert substantially all the phosphate values to a product which may be satisfactorily acidulated to wet-process phosphoric acid. Furthermore, the need to fully utilize the appreciable organic content of this rock, possibly as a fuel, is a consideration of the instant invention.

2. Description of the Prior Art

The prior art teaches that attempts have been made to beneficiate unaltered or partially altered lower grade Idaho rocks in order to produce a concentrate acceptable for acidulation to phosphoric acid. For example, A. R. Rule et al. (Mining Engineering, pages 37–40, January 1978) demonstrated that a combination of calcining at 800° C. and physical beneficiation by froth flotation for some samples of such rock resulted in a sufficiently high grade concentrate of relatively high yield, but in general, yields of concentrate were disappointingly low, and much of the phosphate values were lost to the tailings. Where the phosphate was intimately and strongly bonded or cemented to accessory minerals, as in the more indurated shales, concentrates of a sufficiently high grade were not achieved.

A method of calcining phosphate rocks from Florida, Israel, Jordan, and Morocco, and reputedly also to be suitable for Idaho rock, is disclosed in U.S. Pat. No. 4,325,928, Edward J. Lowe. In the process described therein, phosphate rock is calcined at low temperatures (380° C.–600° C.), preferably in an atmosphere containing an excess of oxygen. While this process would minimize sulfide formation in the calcine, it unfortunately ignores and does not exploit the potential fuel values available when substantial organic matter is contained within the rock. Rather than attempting to utilize the organic impurities as an energy source, the organic matter is preferably and substantially converted in this prior art process to solid particulate carbon which is filtered off during subsequent acidulation and thus wastefully discarded with the calcium sulfate filter cake. A further drawback to this process, when applied to Idaho rock, is its inability to transform the lower grade rock and shales to a calcined product with sufficiently low Mg, Al, and Fe acid solubilities to be acceptable for acidulation to phosphoric acid.

It is apparent, therefore, that none of these prior-art processes can be technically and economically utilized to recover substantially all the phosphate values from a mixture of interbedded high and low grade unaltered Idaho phosphate rock.

SUMMARY OF THE INVENTION

According to the teachings of the present invention, a high quality thermally treated product suitable for wet-process phosphoric acid manufacture is produced, directly or after physical beneficiation, from unaltered or partially altered Idaho phosphate rock, by heating the rock at low temperatures in the range of about 450° C.–500° C. in the absence of, or with controlled additions of, air or water, using a dynamic gaseous environment such as that provided by a fluidized bed reactor to remove substantially all of the organic matter from the heated rock. The organic matter volatilized by this treatment is a useful by-product and may be utilized as a fuel. Energy requirements for said thermal treatment are indirectly, or in part directly, provided by combusting excess air with another portion of organic rich phosphate rock at low temperatures in the range of about 590° C.–650° C. Use of the higher grade portion of the rock, or that which can be upgraded to a $P_2O_5$ content exceeding about 28 percent by physical beneficiation, is most suitable for this embodiment.

In another embodiment of the present invention, the energy requirements for said thermal treatment are provided by combusting excess air with lower grade organic rich phosphatic shales at temperatures in the range of about 950° C.–1150° C. This combustion step thermally transforms a substantial portion of the undesirable impurities in the low grade shale used in this step to an acid insoluble form, thereby converting this portion of the feed material to an intermediate product in a form suitable when subsequently incorporated in the manufacture of wet-process phosphoric acid. External energy requirements for this higher temperature combustion step are in turn provided wholly, or at least substantially, by the fuel recovered in the coupled low temperature retorting process for the higher grade rock.

OBJECTS OF THE INVENTION

In view of the foregoing, it is a principal object of the present invention to provide a thermal process for converting substantially all the phosphate values in a phosphate deposit containing appreciable low-grade phosphatic shales and substantial organic impurities, such as the Phosphoria Formation of Idaho, to an improved material fully suitable for acidulation to phosphoric acid by the wet process.

It is a further object of the present invention to provide a process for thermally beneficiating Idaho unaltered or partially altered phosphate rock and shale whereby the energy requirements of said process are minimized by fully utilizing the fuel values of the accessory organic matter contained within the phosphatic ore.

Still further and more general objects and advantages of the present invention will appear from the more detailed description set forth below, it being understood, however, that this more detailed description is given by way of illustration and explanation only and not necessarily by way of limitation since various changes therein may be made by those skilled in the art without departing from the true spirit and scope of the present invention.

DESCRIPTION OF THE DRAWING

This invention, together with further objects and advantages thereof, will be better understood from a consideration of the following description taken in connection with the accompanying drawing in which:

The FIGURE is a block representation illustrating the thermal process for recovering substantially all the $P_2O_5$ values from unaltered or partially altered Idaho phosphate rock and shales as an improved product rendered suitable for wet-process phosphoric acid manufacture.

Referring now more specifically to the FIGURE, vessel 1 represents any means, including a reactor, suitable for containing, mixing, and heating the charge of higher grade phosphate rock from which the organic matter is to be volatilized, and is preferably a fluidized bed reactor. The rock, dried, sized, and physically beneficiated as necessary and of a grade acceptable for wet-process acid production after the thermal treatment thereof, with or without additional physical beneficiation, is fed to vessel 1 via line 2 at a flow rate sufficient to maintain reactor 1 at its operating temperature. Any air, water, or catalyst found desirable for enhancing the volatilization of the organic matter from the heated rock is added to reactor 1 via line 3. The resulting heated rock product, substantially free of organic matter exits vessel 1 via line 4. The volatilized organic matter and other hot gases exit vessel 1 via line 5 and are conveyed thereon to preheater 6 wherein they indirectly preheat the rock for the combustion process effected in vessel 7 whereby is provided the necessary heat for the retorting process effected in vessel 1. Passage of line 5 through preheater 6 also provides for formation of some fuel condensate which is led off via line 8. All or a portion of the residual hot gas stream in line 5 is subsequently recirculated to vessel 1 via line 9 to provide a major portion of the fluidizing gas for the organic retorting step therein.

The organic rich phosphatic rock or shale used in the combustion circuit is fed at the required rate to combustion preheater 6 via line 10 and then transferred via line 11 to combustion vessel 7 which is preferably operated as a fluidized bed combustor. The fluidizing medium, air in sufficient quantity to maintain an excess of oxygen, enters vessel 7 via line 12. Where fuel requirements in excess of that supplied by the organic matter from the phosphate rock are necessary to maintain the operating temperature in vessel 7, additional fuel may be added by any of three methods, which may also be used in combination. In the first and most preferred embodiment for the practice of the instant invention, part of the hot gas from line 9 in the retorting circuit is diverted to line 13 and fed to veseel 7. A method for practicing the instant invention in another embodiment thereof is to inject a portion or all of the condensate from line 8 via line 14. Still a third embodiment of the instant invention provides for feeding to reactor 7 supplemental fuels such as coal, oil, or natural gas via line 15. The calcined rock or shale product substantially freed from organic residues exits reactor 7 via line 16. The hot combustion gases are then indirectly fed to retorting vessel 1 via line 17, wherein they are utilized in maintaining the operating temperature of vessel 1 prior to any necessary scrubbing and release to the atmosphere. A portion of the hot combustion gases in line 17 may, if required, be diverted to line 18 for direct mixing with the fluidizing gases in line 9. Although not indicated as such in the drawing, the hot product solids in lines 4 and 16 may be used to preheat the fluidizing gases in lines 9 and 12. Additional heat exchanger units, cyclone separators, and other operations, the use and necessity of which would be apparent to those skilled in the art after they have had the benefit of examining the instant disclosure, have also been omitted from the block drawing for the sake for clarity. The placement of a number of means for control of flow, as for example, in controlling the relative amounts of combustion gases entering lines 17 and 18 after exiting vessel 7, would also be within the purview of those skilled in the art once they have familiarized themselves with the instant teachings and has also been omitted from the FIGURE for the sake of clarity.

DESCRIPTION OF THE PREFERRED EMBODIMENTS

In the preferred embodiment of the instant invention, the organic rich, higher grade rock, is retorted at relatively low temperatures, i.e., about 450° C.-500° C. Since heating at higher temperatures, especially within the range of 700° C.-770° C., may cause appreciable formation of undesirable sulfides in the product, use of such low temperatures is particularly advantageous in that formation of said sulfides therein is thereby substantially eliminated or maintained at desirably low levels. Addition of small amounts of air or water to reactor 1 or addition of gases from the combustion circuit may enhance the volatilization of the organic matter from, and minimize the formation in, the solid feed material. Any partial combustion of the organic matter will reduce the energy requirements of the retorting process. The amount and nature of the accessory minerals in the phosphate feed, such as illite clay, may also affect and enhance organic matter volatilization and minimize char formation, as may provision of small amounts of additives to the feed rock.

My laboratory tests have shown quite unexpectedly that over half of the organic matter in unaltered Idaho phosphate rock is often soluble as humic acids in mildly alkaline solutions, demonstrating that much of the organic matter is beneficially of a relatively low molecular weight or readily converted to this state, and is not predominately a crosslinked intractable material. This finding can account for the observed ease of volatilization of the organic matter, and is surprising, given the geological history of the phosphate rock in Southeast Idaho whereby that organic matter still present in the rock was presumed to be a rather intractable organic residue which remained after migration of an associated petroleum fraction which previously formed as a result of appreciable burial metamorphism. My laboratory tests have also shown that a dynamic gaseous atmosphere such as provided by a fluidized bed reactor is beneficial in enhancing the removal of the organic matter from the rock and minimizing formation of a carbonaceous char in the resulting heated product.

The nature of the phosphate rock preferably used in this low temperature thermal treatment to generate fuel is such as to result in the manufacture of a product having excellent acidulation quality with a $P_2O_5$ content of about 29 percent or higher and with concentrations of detrimental acid soluble metals such as Mg, Al, and Fe in the product sufficiently low to yield an acceptable grade of wet-process phosphoric acid upon acidulation of the rock product. Rock from both unaltered and partially altered higher grade beds upgraded to about 28 percent $P_2O_5$ by washing and scrubbing prior to my new and novel thermal treatment are most suitable. Also acceptable are the less indurated organic rich lower grade rocks and shales which can be further beneficiated to a desirable composition by physical beneficiation techniques such as froth flotation, either prior or subsequent to my low temperature thermal treatment.

The combustion step of the instant invention carried out as described supra provides for operation in one of two modes. As practiced in the first mode, rock is combusted with excess air at low temperatures of about 590° C.-650° C. with the primary purpose of supplying sufficient heat to the reactor in the retorting circuit. Preferably the rock feed is of a quality which, after the rock calcination in the combustion vessel and any necessary physical beneficiation, is also suitable for wet-process acid manufacture. In one embodiment of the present invention, predetermined quantities of the high grade rock to be retorted in the reactor is diverted to the combustion circuit to provide the necessary heating requirements of the retorting process. Advantageously, the more readily combustible rock fractions containing the finer particles are used in the combustion process. Alternatively, a portion of the beneficiated lower grade shale found suitable for the retorting circuit may instead be utilized in the low temperature combustion process. Operating temperatures of the combustion process are maintained at temperatures below 700° C. to minimize formation of deleterious sulfides.

As practiced in the second mode, the combustion step of the instant invention is operated at considerably higher temperatures, about 950° C.–1150° C., with excess oxygen present and with supplemental fuels such as coal, oil, or natural gas, if deemed necessary. Most of the fuel requirements should be met by combustion of the organic matter in the shale together with that derived from the retorted rock. This mode of calcination is desirable for those lower grade shales which are highly indurated and with phosphate values which can only be separated from accessory minerals and significantly upgraded by the most undesirable step of extremely fine grinding. Due to the undesirably high content of acid soluble Mg, Al and Fe arising from the presence of accessory minerals such as illite clay and dolomite, which together with silica from a tightly bonded matrix with the phosphate particles, said shale is not, without the benefit of the teachings of the instant invention, suitable for acidulation to phosphoric acid. An appreciable fraction of the phosphate values will often be located in such an indurated shale, especially in unaltered beds. By calcining this material at temperatures in the range of 950° C.–1150° C., the acid soluble Mg, Al and Fe species in the accessory minerals are thermally transformed and immobilized to an acid insoluble and thereby more desirable form, yielding a higher quality calcined product which can be directly acidulated to phosphoric acid by the wet process. My laboratory tests show, for example, that dolomite, ubiquitous to the unaltered shales and being the major source of acid soluble Mg, is substantially converted by the heat treatment to the highly acid-insoluble product diopside, $CaMg(SiO_3)_2$, by reaction with the fine grained quartz also present in the indurated shale matrix.

To provide for conversion of substantially all the $P_2O_5$ values to a form which may be satisfactorily acidulated, the tailings or slimes remaining after beneficiation of the rock or shale prior or subsequent to the retorting or instant low temperature mode of combustion, may also be subjected to the high temperature combustion mode to immobilize the acid soluble impurities contained therein and convert the tailings to a product also suitable for acidulation. Such a treatment of the tailings or slimes fraction is advantageous, as this fraction is inevitably enriched in accessory clays and finely divided dolomite particles, which are the predominant sources of the soluble Al, Fe and Mg.

To provide for optimum acidulation behavior of the rocks and shales processed by means of this invention, products from the different processing steps of circuits may be acidulated separately or blended together prior to acidulation. Phosphate rock not subjected to the processes of this invention may also be blended into the acidulation product rock processed by this invention.

It will be appreciated by those skilled in the art that selection of processing conditions and the relative distribution of the raw phosphate rock and shale amongst the various processing streams of the invention will depend on the availability and nature of the materials to be thermally treated, on the energetics of the retorting and combustion steps, on the design of the retorting, combustion, and other necessary units, and on the desired characteristics of the thermally treated products.

EXAMPLES

In order that those skilled in the art may better understand how the present invention can be practiced, more fully and definitely understood, and utilized, the following examples are given by way of illustration and not necessarily by way of limitation.

EXAMPLE I

A sample of washed and screened phosphate rock from Idaho was divided into size fractions by dry screening. Chemical analysis of the −48 +65 mesh fraction is shown in Table I, infra. This fraction represents 13.5 percent by weight of the total sample, and its chemical analysis is very similar to that of the head sample. A portion of the −48/+65 mesh fraction, characterized by a minimum fluidization velocity of 6.3 cm/sec, was subjected to heating in a laboratory fluidized bed reactor at 450° C. for 60 minutes with a fluidizing velocity of 23 cm/sec. After cooling, the thermally treated product was analyzed. The organic carbon content had been reduced ten-fold, i.e., from 2.87 percent to about 0.29 percent, the acid evolved sulfide content was still desirably low, i.e., having only increased from 0.022 percent to 0.03 percent and the $P_2O_5$ content had increased from 29.3 to 30.9 percent after this heat treatment. Another portion of this rock was heated under identical conditions in a muffle furnace. Although the sulfide content was identical to that heated in the fluidized bed, organic carbon removal was rather incomplete, i.e., 1.1 percent remaining in the product after heating. These results demonstrate the beneficial effect of a dynamic gaseous atmosphere as provided by a fluidized bed in removing the organic matter from the phosphate rock.

Although air was used as the fluidizing medium in this example, other laboratory heating tests performed in air on particles of various sizes showed that, even in air, a reducing rather than an oxidizing atmosphere predominates within the interior of heated Idaho phosphate particles until a major portion of the organic matter has been removed from the particles and that most of the organic matter removal from within such particles occurs via a nonoxidative volatilization process. These and additional tests performed in flowing atmospheres of carbon dioxide indicate that, within the temperature range of 450° C. to 500° C. under reducing conditions, sulfide levels in the heated rock would be no higher or only slightly higher than that found in the present example, that is, the acid evolved sulfide content of Idaho phosphate ore subject to the retorting step of this invention, would advantageously remain at levels of less than about 0.05 percent in the thermally treated product. For the rock used in this example, the acid evolved sulfide content after heating increased by about 36 percent over that level initially present. However, as the initial levels of acid evolved sulfide in raw Idaho phosphate ores can vary from nearly zero to about 0.04 percent by weight, the percentage increase in acid evolved sulfide after retorting can vary widely. The increase in acid evolved sulfide after heating is not dependent on the initial level of acid evolved sulfide but derived mainly from conversion of inorganic sulfate and organic sulfide present in the ore. The combined content of these two acid evolved sulfide precursors, accounting for the major portion of the sulfur species in the ore, is generally rather similar in magnitude for different unaltered Idaho phosphate ores and is usually in the range of about 0.5 to 0.9 percent S by weight. Thus an acid evolved sulfide level in retorted ores of less than 0.05 percent by weight represents at maximum a less than 6 to 10 percent conversion of the sulfide precursors to acid evolved sulfide by the low temperature retorting process of this invention, and an even lower conversion after taking into account that acid evolved sulfide present prior to heating.

TABLE I

| Chemical Analysis of −48/+65 Mesh Feed Fraction | |
|---|---|
| | Weight, % |
| $P_2O_5$ | 29.3 |
| CaO | 40.5 |
| MgO | 0.73 |
| $Al_2O_3$ | 2.25 |
| $Fe_2O_3$ | 0.83 |
| $SiO_2$ | 11.7 |
| $Na_2O$ | 0.91 |
| $K_2O$ | 0.30 |
| S (total) | 0.8 |
| S (sulfate) | 0.57 |
| S (sulfide, acid-evolved) | 0.022 |
| $CO_2$ | 2.30 |
| Organic C | 2.87 |

EXAMPLE II

A portion of the −48/+65 mesh rock similar to that used in Example I supra was heated in the same fluidized bed at 700° C. for 60 minutes in air. The residual organic carbon content was only slightly lower (0.17 versus 0.29 percent) than the sample heated at 450° C. for 60 minutes as given in Example I, but the acid evolved sulfide level was substantially higher (0.10 versus 0.03 percent). The results of this example taken in conjunction with those of Example I supra demonstrate that heat treatment at low temperatures such as 450° C. beneficially decreases the sulfide formed threefold while still eliminating substantially the same amount of organic carbon as does the 700° C. treatment for the same heating residence time (90.5 versus 94.6 percent of organic C, after correcting for weight lost from the sample during heating).

EXAMPLE III

In Table II, infra, there is shown the chemical analysis of a typical highly dolomitic Idaho phosphatic shale, of a grade not suitable by the presently available best technology for direct acidulation to phosphoric acid by the wet process, but currently stockpiled when minded.

TABLE II

| Chemical Analysis of Phosphatic Shale | |
|---|---|
| | Weight, % |
| $P_2O_5$ | 17.9 |
| CaO | 32.3 |
| MgO | 3.9 |
| $Al_2O_3$ | 3.2 |
| $Fe_2O_3$ | 1.2 |
| $SiO_2$ | 20.2 |
| $Na_2O$ | 0.41 |
| $K_2O$ | 0.74 |
| S (total) | 0.71 |
| S (sulfate) | 0.20 |
| F | 2.0 |
| $CO_2$ | 10.1 |

TABLE II-continued

| Chemical Analysis of Phosphatic Shale | |
|---|---|
| | Weight, % |
| Organic C | 2.95 |

Appreciable quantities of accessory quartz, illite clay, potassium feldspar and rhombic carbonates are intimately bonded with the phosphate mineral, francolite, in the shale. The rhombic carbonates were represented by 16 percent dolomite and 2 percent calcite. Three portions of this shale, ground to pass 100 mesh, were calcined under the following conditions:

| Sample | | Calcination time (min.) | Temperature (°C.) |
|---|---|---|---|
| A | | 120 | 1000 |
| B | | 30 | 1050 |
| C | Step 1 | 30 | 1150 |
| | Step 2 | 60 | 950 |

These calcines were then digested for 30 minutes at 60° C. in 10 percent $HNO_3$ (50 g sample/liter extractant). These extraction conditions effect metal solubility values closely approximating those obtained in presently practiced commercial wet phosphoric acid processes. After removal of the insoluble residues, the filtrates were analyzed for soluble Mg, Al, Fe, and $P_2O_5$. The resulting percentages of the metals in the shales found acid insoluble after the thermal treatment are presented in Table III, infra. In all instances $P_2O_5$ remained completely acid soluble, and complete removal of organic matter from the calcine was accomplished. Sulfide levels also remained beneficially low at 0.01 percent non-sulfate S (including acid-evolved sulfide) in all three samples.

TABLE III

| Percentage of Metals Insoluble in 10% $HNO_3$ | | | |
|---|---|---|---|
| Sample | Mg | Al | Fe |
| A | 25 | 42 | 54 |
| B | 33 | 50 | 62 |
| C | 69 | 64 | 65 |

These results demonstrate that undesirable metal impurities present in appreciable quantities in low grade Idaho phosphatic shales may be substantially converted to an acid insoluble form, with the metal immobilization improving as severity of the heat treatment increases. For sample C, which was subjected to a 30-minute treatment at 1150° C. followed by a further 60 minute heat treatment at 950° C., fully two-thirds of the metals in the accessory minerals are shown to be rendered acid insoluble.

INVENTION PARAMETERS

After sifting and winnowing through the data supra, as well as other results and operation of my new, novel, and improved method for processing Idaho phosphate rock, I now present the acceptable and preferred temperature parameters for the process as shown below.

| Process Step | Rock Quality | Operating Range (°C.) | Preferred (about) (°C.) |
|---|---|---|---|
| Retorting | High | 350–600 | 450–500 |
| Combustion | High | 550–680 | 590–650 |

-continued

| Process Step | Rock Quality | Operating Range (°C.) | Preferred (about) (°C.) |
|---|---|---|---|
| Combustion | Low | 900–1180 | 950–1150 |

While I have shown and described particular embodiments of my invention, modifications and variations thereof will undoubtedly occur to those skilled in the art. I wish it to be understood therefore that the appended claims are intended to cover such modifications and variations which are within the true scope and spirit of my invention.

What I claim as new and desire to secure by Letters Patent of the United States is:

1. An improved process for effecting simultaneously the removal of substantially all of the congeneric organic matter and the formation of negligible sulfide in unaltered or partially altered phosphate ores of the type originating in the geological entity described as the Phosphoria Formation, as found, for example, in the southeastern portion of the State of Idaho and contiguous areas, thereby resulting in an intermediate phosphate ore product rendered eminently suitable for subsequent acidulation with sulfuric and/or phosphoric acids to produce improved wet-process phosphoric acids, which improved process comprises the steps of:
   (a) introducing into a dynamic gaseous environment, said environment operating at a temperature ranging from about 450° C. to about 500° C. and under reducing conditions, a feed of said phosphate ores and maintaining said ores therein for a predetermined time sufficient to ensure that substantially all of the congeneric organic impurities therein are retorted therefrom,
   (b) removing from said environment as a useful fuel by-product the resulting retorted organic impurities, and
   (c) recovering from said environment the resulting thermally treated ores,
said improved process characterized by the fact that the congeneric organic impurity content of the resulting thermally treated intermediate phosphate ore product is reduced by at least about one order of magnitude, and the sulfide content thereof is increased to less than about 0.05 percent by weight.

2. An improved process for effecting simultaneously the removal of substantially all of the congeneric organic matter and the formation of negligible sulfide in unaltered or partially altered phosphate ores of the type originating in the geological entity described as the Phosphoria Formation, as found, for example, in the southeastern portion of the State of Idaho and contiguous areas, thereby resulting in an intermediate phosphate ore product rendered eminently suitable for subsequent acidulation with sulfuric and/or phosphoric acids to produce improved wet-process phosphoric acids, which improved process comprises the steps of:
   (a) introducing into a first dynamic gaseous environment, said environment operating at a temperature ranging from about 950° C. to about 1150° C. and under oxidizing conditions, a first feed of said phosphate ores of the low grade shale type and maintaining said ores therein for a predetermined time sufficient to ensure that substantially all of the congeneric inorganic impurities comprising Mg, Al, and Fe are rendered substantially insoluble in mineral acids selected from the group comprising sulfuric, phosphoric, and mixtures thereof,
   (b) removing the resulting thermally treated ores of the low grade shale type directly or indirectly to wet-process phosphoric acid production means,
   (c) introducing into a second dynamic gaseous environment, said second environment operating at a temperature ranging from about 450° C. to about 500° C. and under reducing conditions, a second feed of said phosphate ores of the high grade rock type and maintaining said ores therein for a predetermined time sufficient to ensure that substantially all of the congeneric organic impurities therein are retorted therefrom,
   (d) removing from said second environment as a useful fuel by-product, the resulting retorted organic impurities, and introducing same for recovery of the heat values therein into step (a) supra, and
   (e) recovering from said second environment the resulting thermally treated ores, said improved process characterized by the fact that the congeneric organic impurity content of the resulting thermally treated intermediate phosphate ore product from step (e) supra is reduced by at least about one order of magnitude, the sulfide content thereof is increased to less than about 0.05 percent by weight, and said improved process further characterized by the fact that resulting thermally treated ores of the low grade shale type recovered in step (b) supra, by virtue of their said inorganic impurities being rendered said acid insoluble are effective in effecting a process for the production of wet-process phosphoric acid, which process is substantially free of the deleterious effects of high viscosities, sludge deposits, and relatively low filtration rates normally associated therewith.

3. An improved process for effecting simultaneously the removal of substantially all of the congeneric organic matter and the formation of relatively small amounts of sulfide in unaltered or partially altered phosphate ores of the type originating in the geological entity described as the Phosphoria Formation, as found, for example, in the southeastern portion of the State of Idaho and contiguous areas, thereby resulting in an intermediate phosphate ore product rendered eminently suitable for subsequent acidulation with sulfuric and/or phosphoric acids to produce improved wet-process phosphoric acids, which improved process comprises the steps of:
   (a) introducing into a first dynamic gaseous environment, said environment operating at a temperature ranging from about 590° C. to about 650° C. and under oxidizing conditions, a first feed of said phosphate ores and maintaining said ores therein for a predetermined time sufficient to ensure that substantially all of the organic impurities therein are substantially eliminated therefrom,
   (b) removing the resulting thermally treated ores directly or indirectly to wet-process phosphoric acid production means,
   (c) introducing into a second dynamic gaseous environment, said second environment operating at a temperature ranging from about 450° C. to about 500° C. and under reducing conditions, a second feed of said phosphate ores along with the excess enthalphic values generated in step (a) supra and maintaining said ores therein for a predetermined time sufficient to ensure that substantially all of the congeneric organic impurities therein are retorted therefrom, (d) removing from said second environment as a useful fuel by-product, the resulting retorted organic impurities, and (e) recovering from said second environment the resulting thermally treated ores, said improved process characterized by the fact that the congeneric organic impurity content of the resulting thermally treated intermediate phosphate ore product from step (e) supra is reduced by at least about one order of magnitude, and the sulfide content thereof is increased to less than about 0.05 percent by weight.

* * * * *